(12) United States Patent
Bootle et al.

(10) Patent No.: US 8,502,531 B2
(45) Date of Patent: Aug. 6, 2013

(54) SENSOR ARRANGEMENT

(75) Inventors: Geoffrey David Bootle, Maidstone (GB); John Deller, Rochester (GB)

(73) Assignee: Delphi Technologies Holding S.arl, Luxembourg (LU)

( * ) Notice: Subject to any disclaimer, the term of this patent is extended or adjusted under 35 U.S.C. 154(b) by 207 days.

(21) Appl. No.: 12/922,115

(22) PCT Filed: Mar. 25, 2009

(86) PCT No.: PCT/GB2009/050285
§ 371 (c)(1),
(2), (4) Date: Oct. 21, 2010

(87) PCT Pub. No.: WO2009/118555
PCT Pub. Date: Oct. 1, 2009

(65) Prior Publication Data
US 2011/0050220 A1 Mar. 3, 2011

(30) Foreign Application Priority Data
Mar. 25, 2008 (GB) .................................. 0805263.1

(51) Int. Cl.
*G01R 33/07* (2006.01)

(52) U.S. Cl.
USPC ........................................ 324/251; 324/207.2

(58) Field of Classification Search
USPC ............................................. 324/207.2, 251
See application file for complete search history.

(56) References Cited

U.S. PATENT DOCUMENTS

| 4,541,576 | A | | 9/1985 | Sachleben et al. |
|---|---|---|---|---|
| 5,503,683 | A | * | 4/1996 | Butcher et al. ............. 134/22.12 |
| 5,722,373 | A | * | 3/1998 | Paul et al. ..................... 123/446 |
| 5,904,126 | A | | 5/1999 | McKay et al. |
| 6,068,672 | A | * | 5/2000 | Watson et al. ................... 44/629 |
| 6,909,281 | B2 | | 6/2005 | Gassman et al. |
| 6,941,932 | B2 | | 9/2005 | Hopley et al. |
| 7,005,847 | B2 | | 2/2006 | Gassman et al. |
| 7,188,710 | B2 | | 3/2007 | Reuter et al. |

FOREIGN PATENT DOCUMENTS

| CN | 1678886 A | 10/2005 |
|---|---|---|
| CN | 1751229 A | 3/2006 |
| EP | 1 356 196 | 8/2006 |
| JP | 61-23836 | 2/1986 |
| JP | 2002-267405 | 9/2002 |
| WO | 95/26461 | 10/1995 |

OTHER PUBLICATIONS

Abstract Translation of JP 61-23836A, Feb. 1, 1986.*
Abstract Translation of JP 2002-267405A, Sep. 18, 2002.*
International Search Report dated Sep. 24, 2009.
Comments regarding Japan Office Action dated Nov. 13, 2012.
English Translation of China Office Action dated Jan. 31, 2013.

* cited by examiner

*Primary Examiner* — Bot Ledynh
(74) *Attorney, Agent, or Firm* — Mark H. Svoboda

(57) ABSTRACT

A sensor arrangement and a method for its use for detecting the proximity of a ferrous target, the sensor arrangement comprising a sensor body including a magnetic field source and a Hall effect device, wherein the magnetic field source is an electromagnetic solenoid. The invention has particularly utility, but is not so limited, to the field of fuel injection pumps in which it is necessary to determine the volume of fuel that is delivered to the cylinders of the engine without affecting the operation of the engine.

5 Claims, 1 Drawing Sheet

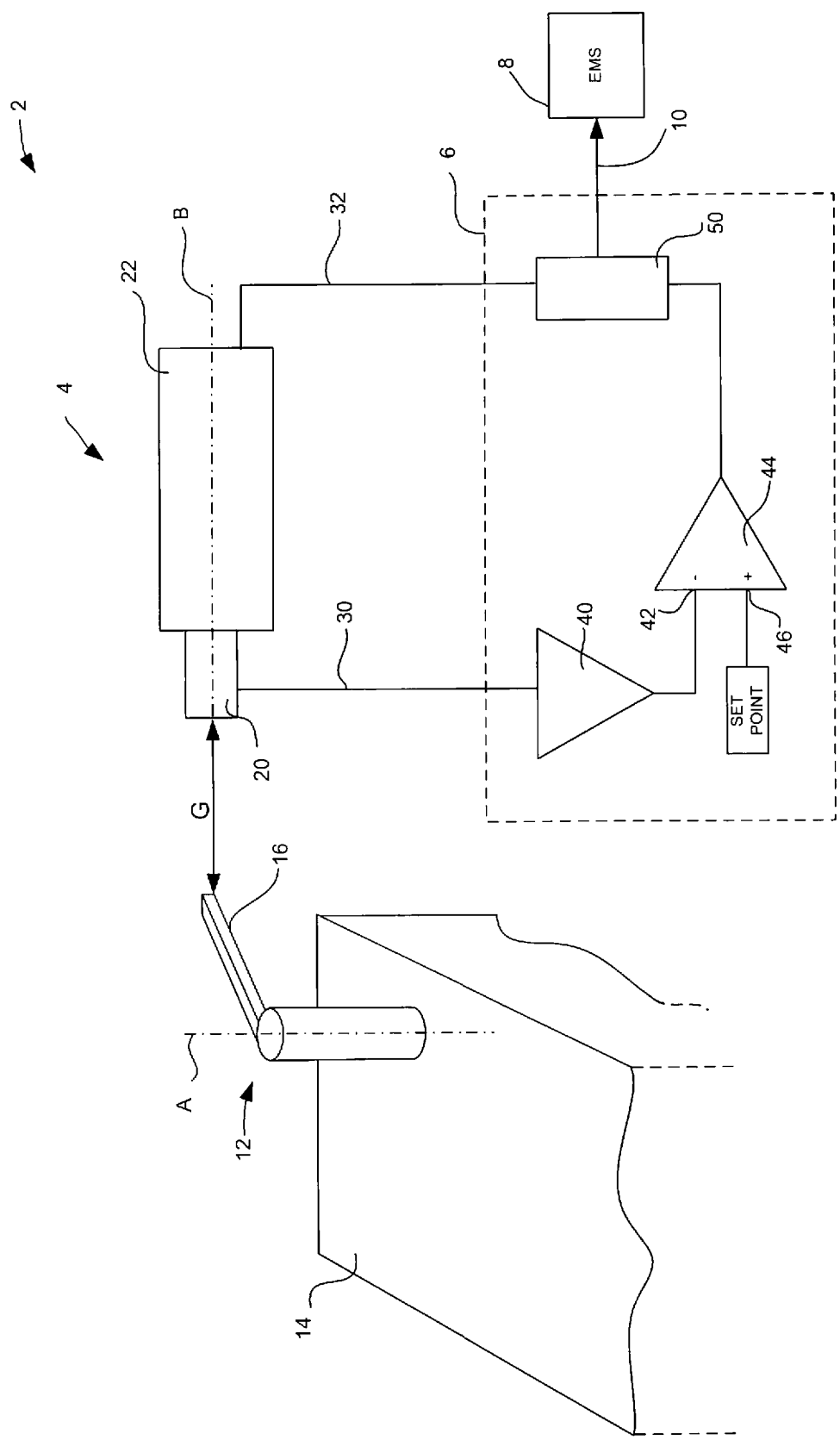

SENSOR ARRANGEMENT

TECHNICAL FIELD

The invention relates to a sensor arrangement and, more particularly, to a sensor arrangement for detecting the proximity of a ferrous 'target' to the sensor arrangement. The invention also relates to a specific application of a fuel injection pump of an internal combustion engine having such a sensor arrangement.

SUMMARY OF THE INVENTION

There are many applications in which it is required to monitor the position of an object; a so-called 'target'. One such application is a rotary fuel injection distributor pump such as may be used on a compression-ignition internal combustion engine, otherwise known as a diesel engine.

The general structural configuration of a distributor fuel pump is known in the art, for example as disclosed in the Applicant's European patent EP1356196, and includes an inlet metering valve that is angularly moveable about its axis to control the volume of fuel that is supplied to one or more pumping elements of the fuel pump. The angular position of the inlet metering valve is controlled by a control arm which extends radially from the axis of the inlet metering valve and which is connected via a control linkage to the throttle and governor mechanism of the vehicle within which the fuel pump is installed.

In order to control the internal combustion engine reliably, it is necessary to have the facility to determine the amount of fuel that is being delivered to the engine and, thus, the load under which the engine is operating. One way in which the amount of fuel delivered to the engine can be determined is to measure the position of the metering valve.

It is common that in a fuel injection pump the internal volume of the pump housing and, therefore, the immediate environment of the inlet metering valve is exposed to fuel which makes the positional determination of the inlet metering valve particularly troublesome. Although there are some contactless position sensors available from off-the-shelf electronics suppliers, for example so-called proximity sensors such as capacitive, inductive and optical sensors, there are difficulties in applying such technologies to the wet, dirty and chemically aggressive environment that is typically associated with automotive fuel injection pumps.

For instance, such sensors may physically be too large to be accommodated within the housing of the fuel pump or the accuracy of the sensor may be adversely affected by the metallic material from which the pump is manufactured or even the properties of the fuel circulating within the housing of the pump.

It is against this background that the invention provides, in a first aspect, a sensor arrangement for detecting the proximity of a ferrous target, the sensor arrangement comprising a sensor module including a magnetic field source and a Hall effect device, wherein the magnetic field source is an electromagnetic solenoid.

An advantage of the invention is that the electromagnetic solenoid permits a variable magnetic field to be used to detect the ferrous target such that the magnetic field strength generated by the solenoid is adaptable to suit the environmental surroundings of the sensor arrangement. Furthermore, the Hall effect device has a rapid response time and does not suffer from significant hysteresis.

Although not essential to the invention, in order to maximise sensing accuracy the Hall effect device may be positioned to be in alignment with a longitudinal axis of the electromagnetic solenoid so that the Hall effect device is exposed to a region having the greatest intensity of magnetic field. Furthermore, although the electromagnetic solenoid and the Hall effect device may be arranged such that they are physically separate from one another, conveniently they may be combined into a single package for ease of installation.

In a preferred embodiment, the sensor arrangement includes a control system configured such that an electrical output signal provided by the Hall effect device controls the current through the electromagnetic solenoid.

A particularly beneficial feature is that the solenoid is configurable with a variable current in order to produce a substantially constant magnetic field strength independent of the proximity of the ferrous target. In this way the magnetic field strength may be set at a predetermined level so as to enable the position of the ferrous target to be sensed accurately when there is a relatively large distance between the ferrous target and the Hall effect device but, when the target is in close proximity to the Hall effect device, the magnetic field strength does not unduly influence the movement of the ferrous target.

The result of this is that the sensor arrangement exhibits less susceptibility to signal interference whilst avoiding magnetic attraction between the sensor arrangement and the ferrous target.

In order to maintain the magnetic field strength between the Hall effect device and the ferrous target at a substantially constant level, the control system may include a closed loop circuit.

In a second aspect the invention includes a fuel injection pump, particularly a rotary distributor fuel injection pump, including an inlet metering valve having a control arm and including a sensor arrangement as defined above for detecting the distance between the sensor arrangement and a ferrous target associated with the control arm.

According to a third aspect of the present invention there is provided a method of operation of a sensor arrangement wherein the strength of the electromagnetic field in an air gap between the solenoid and the ferrous target is detected by the Hall effect device, the Hall effect device outputs a corresponding signal voltage which a comparator compares to a preset voltage, and then outputs a drive current to the solenoid, whereby if the signal voltage is less than the preset voltage the drive current is output at an increased level and if the signal voltage is greater than the preset voltage the drive current is output at a decreased level, the level of the drive current being measured by a current sensing device and the current sensing device outputs a signal which can be interpreted to indicate the position of the ferrous target.

Preferably, the method comprises the further step of amplifying the signal voltage prior to supplying it to the comparator. The comparator may be an operational amplifier.

Preferably, the method comprises the further step of amplifying the drive current before it is supplied to the solenoid.

Preferably, the method comprises the further step of supplying the output from the current sensing device to an engine management system, wherein the engine management system converts the drive current into an indicator of the position of the ferrous target.

It should be appreciated that preferred and/or optional features of the first aspect of the invention may be used with the second aspect of the invention.

BRIEF DESCRIPTION OF THE DRAWING

In order that the invention may be more readily understood, reference will now be made by way of example to FIG. 1 which is a schematic representation of the invention.

BEST MODE FOR CARRYING OUT THE INVENTION

Referring to FIG. 1, a sensor arrangement 2 in accordance with the invention includes a sensor module 4 that is connected electrically to a control unit 6. Although not shown in FIG. 1, the sensor arrangement 2 forms a part of a compression-ignition internal combustion engine and, to this end, the control unit 6 is interfaced with an engine management system (EMS) 8 via a data connection 10 by which means the EMS 8 is able to gather sensor data from the sensor arrangement 2 for use in controlling the engine.

As can be seen in FIG. 1, an inlet metering valve 12 is received by a body of a distributor fuel pump 14 (only shown partially in FIG. 1) and includes a control arm 16 extending radially away from a longitudinal axis A of the inlet metering valve 12. Although not shown in FIG. 1, the control arm 16 is connected to a throttle and governor linkage of the fuel pump 14 so that the angular position of the inlet metering valve 12 is controllable in response to the level of fuel delivery that is demanded by the engine.

The sensor module 4 further includes a Hall effect device 20 that is mounted to one end of an electromagnetic solenoid 22 such that it is located in alignment with a longitudinal axis B of the solenoid 22. An end of the control arm 16 is moveable towards and away from the Hall effect device 20 so as to define a variable air gap G between them. The control arm 16 therefore defines a 'target' of ferromagnetic material for the Hall effect device 20.

The Hall effect device 20 is operable to detect the magnetic field strength that is present in the air gap G and to output a voltage to the control unit 6, that is proportional to the size of the air gap G, via a first electrical connection 30. In response to the voltage output from the Hall effect device 20, the control unit 6 supplies a solenoid drive current to the solenoid 22 via a second electrical connection 32.

The control unit 6 includes a first amplifier 40 which receives the voltage output from the Hall effect device 20 and amplifies the voltage to an acceptable level for a digital circuit. It should be appreciated at this point that although the first amplifier 40 is shown as part as the control unit 6 in FIG. 1, alternatively it may be an integral part of the Hall effect device 20.

The control unit 6 defines a closed loop circuit including an operational amplifier 44 having, as is known in the art, an inverting input 42 and a non-inverting input 46. The voltage output from the first amplifier 40 is input into the inverting input 42, and the non-inverting input 46 receives a voltage that is set to induce a magnetic field of predetermined strength in the air gap G. The voltage at the non-inverting input 46 is referred to hereafter as the 'set point'.

The operational amplifier 44 amplifies the difference between the voltages present at the inverting input 42 and non-inverting input 46 and outputs an amplified solenoid drive current signal via connection 32 to the electromagnetic solenoid 22, through a current measurement resistor 50. The current measurement resistor 50 converts the solenoid drive current signal to a voltage which is fed as an output of the control unit 6 to the EMS 8 via the data connection 10. It should be appreciated that the operational amplifier 44 includes a current amplification function in order to supply a sufficient current to the solenoid 22 in the region of approximately 0 to 1 Amp.

The functionality of the sensor arrangement will now be described in more detail.

The electromagnetic solenoid 22 induces a magnetic field in the air gap G that is determined by the set-point voltage at the non-inverting input 46 of the operational amplifier 44. However, angular movement of the inlet metering valve 12 causes the distance between the control arm 16 and the Hall effect device 20 to vary, which changes the size of the air gap G and, thus, the strength of the magnetic field in the air gap G.

If the control arm 16 moves towards the Hall effect device 20, thus decreasing the size of the air gap G, the magnetic field strength will tend to increase which increases the voltage at the inverting input 42 of the operational amplifier 44. The operational amplifier 44 therefore acts to reduce the difference between the voltage present at the inverting input 42 and non-inverting input 46 by reducing the drive current signal that is fed to the electromagnetic solenoid 22 via the electrical connection 32. As a result, the control unit 6 reduces the magnetic field strength back to the level that is determined by the set-point.

Reducing the current to the solenoid 22 in this way has the advantage that if the control arm 16 moves very close to the Hall effect device 20, it can be ensured that the magnetic field strength does not increase to a level which would affect the movement of the control arm 16. This benefit would not be achievable if a permanent magnet was used since the magnetic field strength would not be controllable and therefore the decreasing air gap potentially could result in the control arm 16 'sticking' to the Hall effect device 20 through magnetic attraction.

A further advantage is that because the drive current is reduced significantly when the control arm 16 moves so as to close the air gap G, it is possible for ferrous contaminants such as metallic particles to be cleaned from the Hall effect device 20 by the motion of fuel that may be present in the internal environment of the fuel pump 14.

Conversely, if the control arm 16 moves away from the Hall effect device 20, the magnetic field strength tends to decrease which decreases the voltage at the inverting input 42 of the operational amplifier 44. The operational amplifier 44 therefore acts to reduce the difference between the voltage at the inverting input 42 and the non-inverting input 46 by increasing the drive current signal that is fed to the electromagnetic solenoid 22. The sensor arrangement therefore adapts to the increasing air gap G to maintain the magnetic field strength at the level determined by the set-point. Increasing the solenoid current in such circumstances provides the sensor arrangement 2 with the advantage that a large range of movement of the control arm 16 can be detected reliably with a low susceptibility to magnetic interference.

Additionally, due to the closed loop control of the drive current signal for the electromagnetic solenoid 22, the voltage that is output to the EMS 8 is not sensitive to temperature changes in its immediate environment which could otherwise spoil the calibration of the sensor arrangement 2 and therefore lead to inaccurate readings.

As a further improvement, the control unit 6 may be arranged to disable the drive current signal periodically or, alternatively, apply a relatively small current of opposite polarity, both of which further promote the self-cleaning of the sensor arrangement.

Although not described above, the sensor arrangement may be arranged to be mounted within a suitable receiving space within the fuel pump, for example within a bore defined by the metallic body of the fuel pump such that the Hall effect device 20 protrudes into the pump in a suitable position in which to detect the movement of the control arm 16. Mounting the sensor arrangement 2 in this way permits the electrical connections of the sensor arrangement 2 to be conveniently routed through the bore and out of the pump which is beneficial in terms of sealing. Alternatively, the sensor arrangement may be arranged such that it is not exposed to the internal environment of the pump but instead is arranged so as to 'look' through the non-ferrous housing of the pump to detect the movement of the ferrous control arm 16.

It should be appreciated that although the sensor arrangement has been described above with specific reference to the application of the fuel injection pump, the invention is also applicable to any application in which it is required to detect the proximity of a ferrous target.

The invention claimed is:

1. A sensor arrangement for detecting the proximity of a ferrous target, the sensor arrangement comprising a sensor module including a magnetic field source and a Hall effect device, wherein the magnetic field source is an electromagnetic solenoid, wherein the sensor arrangement includes a control unit which receives an electrical output signal from the Hall effect device and supplies a drive current signal to the electromagnetic solenoid, wherein the control unit includes a closed loop control circuit arranged to receive the electrical output signal of the Hall effect device and operable to modulate the drive current signal of the electromagnetic solenoid so as to maintain the magnetic field strength in a region between the Hall effect device and the ferrous target at a substantially constant level.

2. The sensor arrangement of claim 1, wherein the Hall effect device is aligned with a longitudinal axis of the electromagnetic solenoid.

3. The sensor arrangement of claim 1, wherein the Hall effect device and the electromagnetic solenoid are arranged as a single package.

4. The sensor arrangement of claim 1, wherein the control system is arranged to periodically disable the drive current signal to the electromagnetic solenoid.

5. The sensor arrangement of claim 1 wherein the drive current signal to the electromagnetic solenoid is used as an indicator of the position of the ferrous target.

* * * * *